United States Patent [19]

Nelson

[11] 3,863,928

[45] Feb. 4, 1975

[54] CHESSBOARD AND PROGRAMMED PLAYING AID

[76] Inventor: James E. Nelson, 304 Harvard Ave., Wenonah, N.J. 08090

[22] Filed: July 22, 1974

[21] Appl. No.: 490,332

[52] U.S. Cl. ........ 273/136 B, 35/8 R, 273/131 AD, 273/131 B, 273/136 R, 273/136 GB
[51] Int. Cl. ............................................. A63f 3/02
[58] Field of Search .................. 273/131, 136; 35/8

[56] References Cited
UNITED STATES PATENTS

| | | | |
|---|---|---|---|
| 2,490,092 | 12/1949 | Rippenbein | 35/8 R |
| 2,551,318 | 5/1951 | Drew | 35/8 R |
| 3,395,463 | 8/1968 | Worden et al. | 35/8 R |
| 3,579,856 | 5/1971 | Way | 35/8 R |
| 3,613,261 | 10/1971 | Petty | 35/8 R |
| 3,792,186 | 2/1974 | Principe | 35/8 B |

Primary Examiner—Delbert B. Lowe
Attorney, Agent, or Firm—Thomas A. Lennox, Esq.

[57] ABSTRACT

A chessboard onto which are held and displayed eight sets of display cards, each card showing the entire file with the chess piece positions and move indicia that may be selectively displayed, indicating the piece color and the number of the move. The indicia may also include the piece chosen for the next programmed move and information as to that move including the arrival position of the piece. A series of sets of display cards may be programmed for individual play without ana opponent or may be programmed for play by two persons to be interrupted at any time to play out a particular position. A move number indicator slide assembly and timer assembly are provided.

7 Claims, 7 Drawing Figures

PATENTED FEB 4 1975

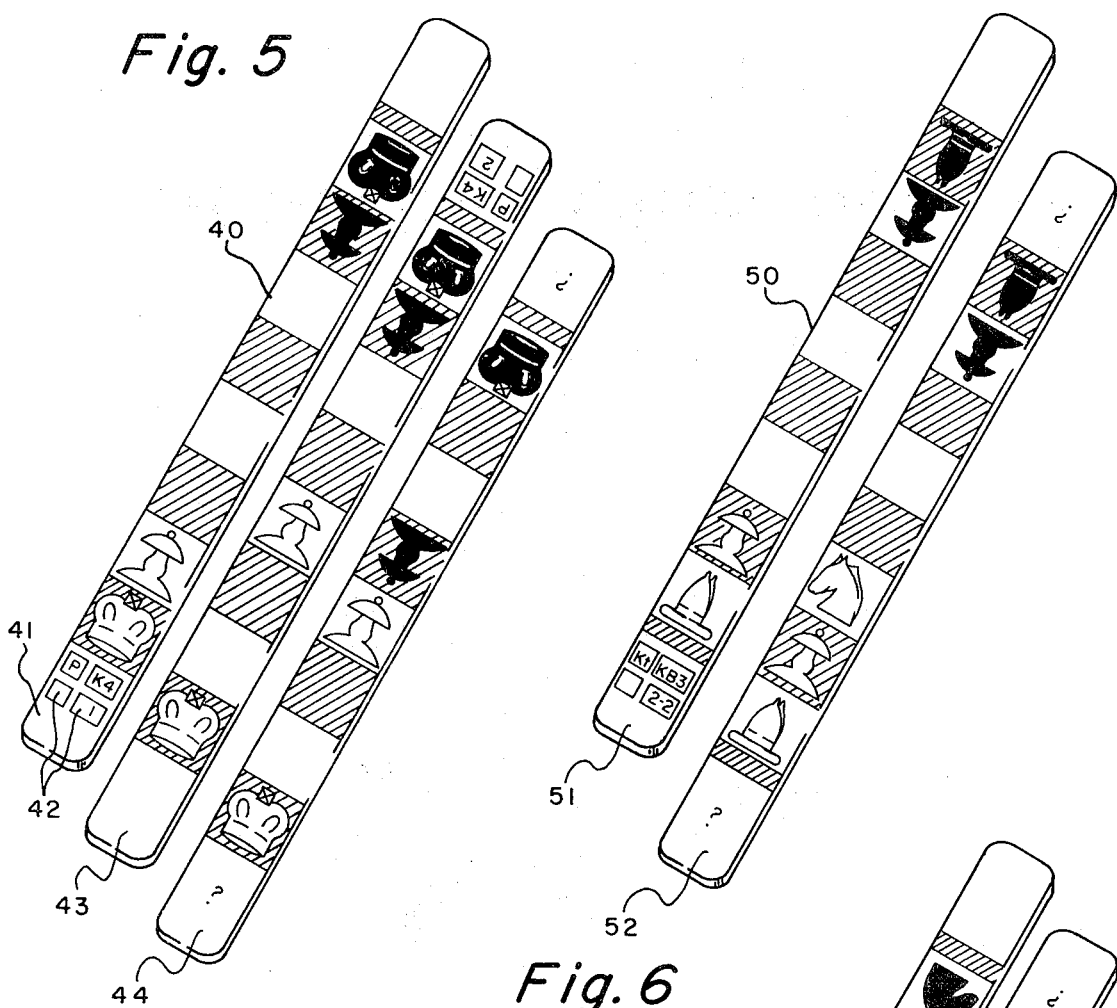
Fig. 5
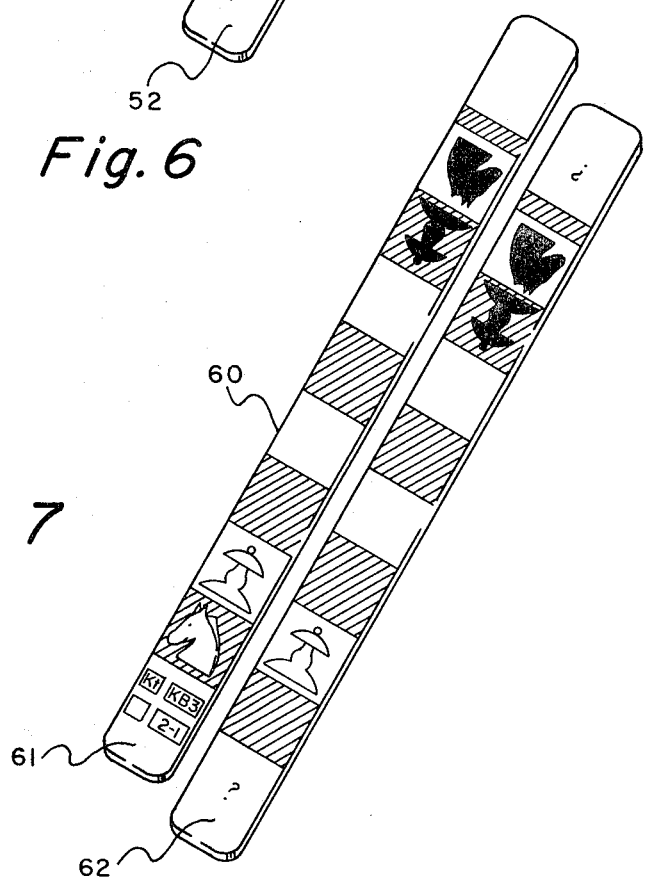
Fig. 6
Fig. 7

CHESSBOARD AND PROGRAMMED PLAYING AID

BACKGROUND OF THE INVENTION

A number of chess instruction devices have been disclosed in the prior art, but none has provided a satisfactory system of both instruction and play which effectively teaches the game to either one or two players with or without the actual use of chessmen. Some of the prior devices include the mechanical chessboard disclosed in U.S. Pat. No. 2,298,456 to F. Benko using chess pieces and sheets larger than the chessboard showing various moves. Diagrams of moves on sheets of paper as large as the chessboard are disclosed in U.S. Pat. No. 2,551,518 to M.J. Drew. Other teaching devices, both mechanical and electronic, include U.S. Pat. No. 3,654,392 to Beinhocker et al, U.S. Pat. No. 3,613,261 to Petty, U.S. Pat. No. 3,579,856 to Way, U.S. Pat. No. 3,339,289 to Arkin and U.S. Pat. No. 2,799,505 to Lyons. None of the above mentioned patents disclose the present invention or fulfill the objects listed hereinbelow.

The object of this invention is to provide a combination of a chessboard and teaching and playing apparatus for the game of chess. An object is to provide a teaching device which can include an entire chess game or part of the chess game programmed to demonstrate a particular aspect of the game or many aspects of an entire game. An object is to provide equipment with which it is possible for an individual to play chess alone against an expert, opposing preprogrammed game, while at the same time having the capability of allowing two opponents to play a programmed game and both attempt to match their expertise with the program.

An additional object is to provide a programmed play wherein an incorrect choice of the best next move will still allow reconsideration of the next move since the choice does not have to give away the correct move. A further object is to provide an apparatus wherein the programmed play can be interrupted at any time to allow the player or players to continue play as they see fit in an unprogrammed fashion to test out alternatives to the suggested programmed play.

These and other objects will be made apparent from the subsequent disclosure and are attained by the invention as further described herein.

SUMMARY OF THE INVENTION

This invention relates to an apparatus to teach the game of chess and allow play thereon. The apparatus comprises a chess board and programmed playing aid assembly which includes a series of sets of display cards, one set for each file of the chessboard. These display cards having the general dimensions of the file of the chessboard are held at the position of that file on a simulated chessboard such that the topmost display card of each set may be viewed at all times without obstruction. Thus, there are a series of eight separate sets of display file cards for each programmed game, one for each file.

The display file cards have the location of the chess pieces imprinted thereon so that, when all of the display cards are in position, the position of all the chess pieces present at that stage of the game may be viewed. On at least one end of the display cards are located move indicia which indicates the piece color and the number of the move involved in the move of that card. When the apparatus is being used by either one or two players, the move indicia are covered and can be seen by neither player until it is that player's move. After the next move is chosen by the player, he uncovers the move indicia to determine if his choice is correct. If his choice is found correct, the uppermost display card is removed, disclosing the new position of the piece moved. If the move chosen is found improper according to the program, the move indicia are covered over and the move is reconsidered with the play proceeding.

The apparatus provided includes sets of display file cards, one set for each file on the chessboard with each card displaying an entire file of the chessboard showing with chess piece symbols the position of the pieces on that file at that particular stage of the game. There is one card for each time any piece on that file is moved or any time any piece is moved onto that file during the programmed game or part of the game. A guide and holding means is provided so that each set of display cards is held in position at its respective file position on the chessboard and to allow removal of the top display card to expose the card directly under it. Also provided are move indicia covering means to prevent general viewing of the indicia but allow selective uncovering of a file move indicia.

BRIEF DESCRIPTION OF THE DRAWINGS

FIG. 5 is a diagram showing a selection of cards of three sets of file cards to show how movement and play is carried out.

FIGS. 6 and 7 show cards from two other sets of file cards.

DESCRIPTION OF PREFERRED EMBODIMENTS

Figure 1:
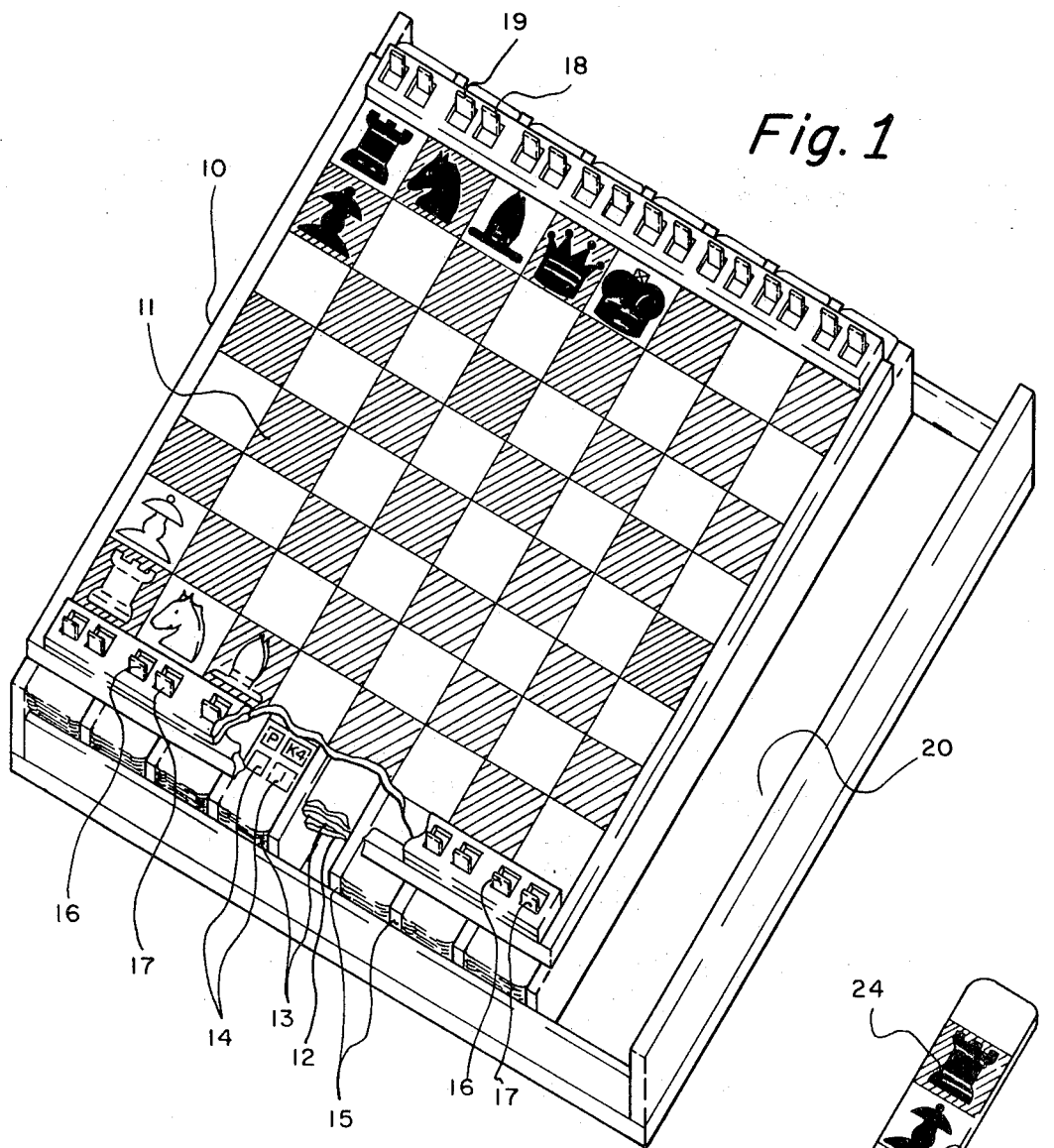
FIG. 1 is a perspective view of a chess playing aid apparatus of this invention.

An embodiment of this invention as shown in FIG. 1 includes playing apparatus 10 consisting of transparent playing surface 11 on which a grid delineating the squares on the chessboard may be placed. Spacing and holding apparatus 12 provides sufficient room for a stack of cards as wide as the rank and longer than the rank so as to provide room at the ends of the cards for indicia 14. A pressure device such as a spring (not shown) is located in space 12 and under the stack of cards 13 so as to springably load the cards and hold them close to the underside surface of transparent playing surface 11. Guides 15 prevent intermixing of the stacks of cards between files. Move indicia 14 are imprinted on the ends of the cards and are hidden from view by moveable covers 16 and 17, one set for each file.

Figure 2:
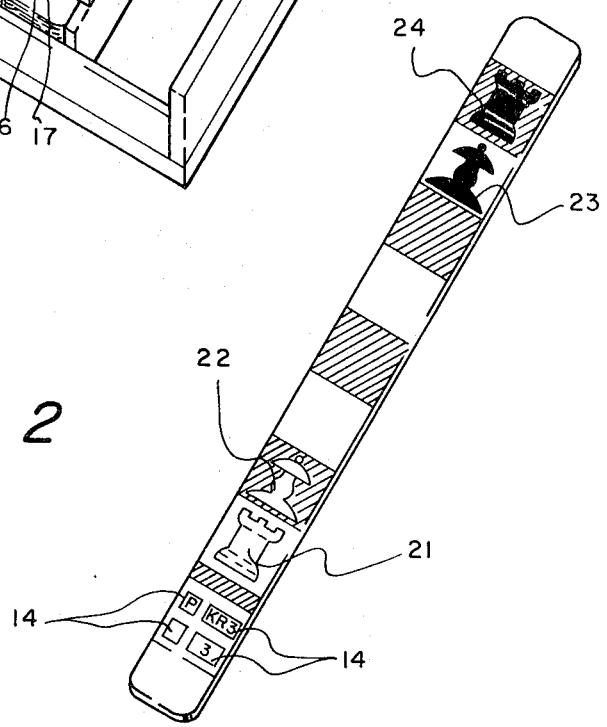
FIG. 2 is a perspective view of a typical display file card used in this invention.

FIG. 2 pictures a typical display card, in this instance that of the king's rook file. Card 13 shows the position of white's king rook 21, white kings rook's pawn 22, black's king rook's pawn 23 and black's king rook 24, all in their starting positions. In this program the move indicia 14 indicate that the first time this file will be affected during the game will be white's third move when he moves the pawn to king's rook three. It should be observed that this card has no indicia on the black side of the card. It is preferred that nothing be on the end of the card opposite to the side having the next move whether the set is a single-man or a two-man programmed game. When this end is blank, an error in play by black in choosing the file at the wrong time would not provide him with any useful information because of his poor judgement. In this embodiment of this invention the indicia moves for black are located on the black side to be observed by the second player. In the embodiment of this invention when the move covers are on only one side of the board the display cards are designed for play by one or two persons from one side of the board. Thus all the move indicia are placed on one end of the cards and the other end of all the cards are left blank. When the display cards are designed by play by two persons from opposite sides of the board all of the white moves indicia are located on the white end of the cards and all of the black move indicia are located on the black end of the cards.

Although the move indicia may be located in a variety of positions and sequences, it is preferred that the move indicia be located as shown on FIG. 2. After the player has determined his next move, indicia cover 16 is first moved to uncover the color of the move as in FIG. 2-white. If the player is incorrect and the opposite color is uncovered, cover 16 should immediately be closed and the player reconsiders his choice. If the color uncovered is correct, he moves indicia cover 17 to uncover the number of the move, as in FIG. 2-"three." If no additional indicia are provided the file card is removed to uncover the next card. If the number of the move corresponds with the player's next move and should additional indicia be provided as in FIGS. 1 and 2, cover 16 is further moved to show the piece to be moved, as in FIG. 2, "p," equals pawn. If the piece chosen by the player corresponds with the piece uncovered, cover 17 is then moved further to uncover indicia to show the movement of the piece, as in FIG. 2— pawn to king's rook three (KR3). Obviously, one cover may be used to uncover all of the indicia at one time, or one cover or a series of covers may be used to uncover the indicia in different orders. The preferred order is to uncover the color first and the number of the move last. If additional indicia are provided it is preferred to next uncover the piece to be moved and finally the arrival position of that piece. In addition, it is necessary for some moves to involve more than one file. In that instance, an indication of a second file involvement may be included in the move indicia by addition of the arrival position indicating what other rank card must be removed to disclose the new arrival position of the piece.

In FIG. 1 the device is shown with sets of covers 18 and 19 when the game is constructed for play by two persons on opposite sides. The second sets of covers are identical to those shown in detail in FIG. 1 and FIGS. 3 and 4. It is clear that the sets of covers 18 and 19 on the opposite side of the board are not necessary to the invention. Two persons may play the game sitting side by side and use the same sets of covers 16 and 17.

Figure 3:
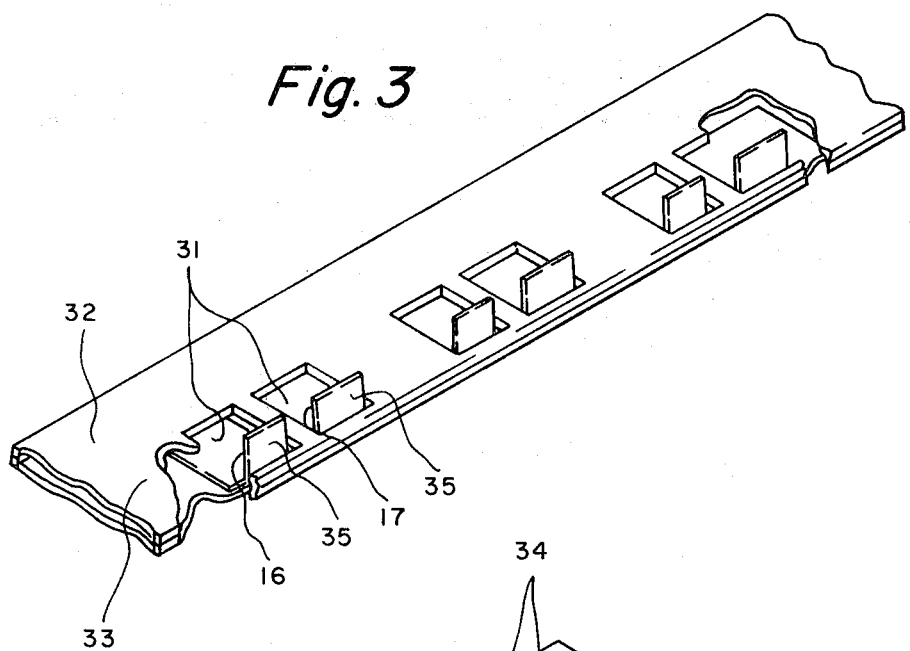
FIG. 3 is a perspective view of a section of move indicia covering means.
Figure 4:
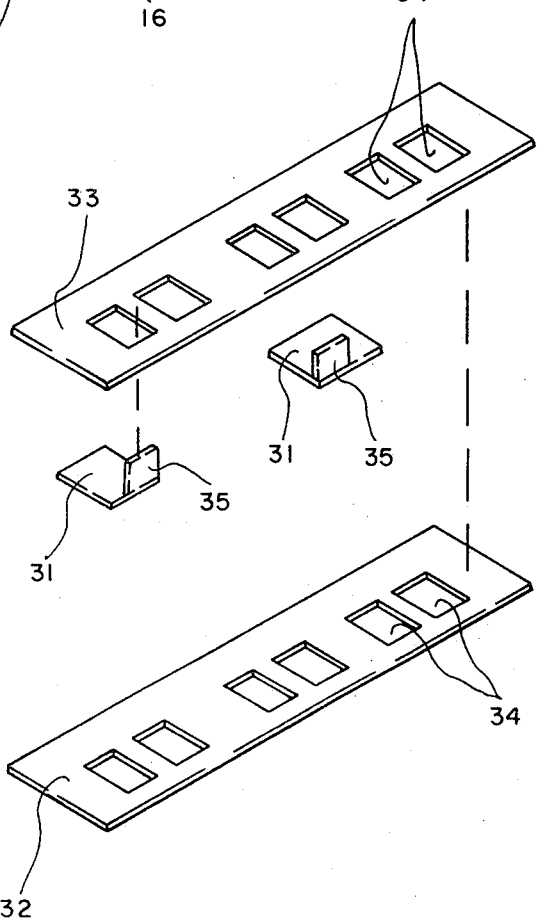
FIG. 4 is an exploded perspective view of the move indicia covering means shown in FIG. 3.

In FIG. 3, a closeup perspective view shows the covers 16 and 17 constructed of sliding plates 31, sandwiched between sheets 32 and 33 with detention stop springs which both have apertures 34 so that when plates 31 are moved aside, an opening is provided to view move indicia 14 located below plate 32. Uprights 35 are rigidly attached to plates 31 to allow easy movement of plates 31 aside to open the apertures 34.

In FIG. 5, selection of typical moves is demonstrated by the use of display file cards. The upper left set 40 of display cards illustrates the king's file from the starting position of display card 41 which shows in move indicia 42 that this is the first move (numeral "1") of this programmed game, that being white pawn ("P") to king four position ("K4"). If the player uncovers these move indicia, he is correct for this programmed game. Once having determined the correct choice the move indicia covers are closed. Then card 41 is removed to uncover card 43, which pictorially displays the advance of the white pawn to the king four position.

This series of cards is designed for play by two persons from opposite sides of the chessboard. Therefore the move indicia for the black pieces are on the black side of the display cards. As noted above the invention may have play from one side of the board, so that the black move indicia would be on the same side as the white. In this programmed game, the player of the black pieces would be correct if he responded with his first move by uncovering the move indicia covers for the movement of the king's pawn to king's file four. In doing so, he finds that the proper move is for his pawn to move to the fourth rank of the king's file. Having determined the correct choice, the move indicia covers are closed and card 43 is removed to uncover the new position of the black pawn on card 44. To simplify this description, both ends of the card 44 are marked with a "?" to indicate neither player would be able to see the covered indicia since indicia covers 16 and 17 and 18 and 19 are in closed position. Actually, one end of card 44 would contain indicia for a later move, but neither party would be sure at which stage of the game this would occur.

In the sample game shown a second set 50 of cards is shown for the king's bishop file. Also shown is set 60 for the king's knight file. Sets 50 and 60 illustrate use of two file cards in a single move. In actual programmed games, a set of display cards is provided for each file. In this programmed game the second move by white is king's knight to king's bishop three. The player of the white pieces guessing this move will uncover the move indicia of the king's knight rank on card 61. When the move indicia are uncovered he will observe that this is indeed the white piece's second move involving this rank first, as indicated by the numerals "2-1." Upon further movement of the covers, he will determine that the piece to be moved is the king's knight "KT" and the arrival position is king's bishop "KB3." Since the king's bishop file is also involved in the move, card 51 is removed as well to uncover cards 52 and 62 to show the new position of the piece. As shown, card 51 contains indicia describing the move. The numerals "2—2" show that this file is the second file affected by white's second move. As before, cards 52 and 62 are marked hidden inasmuch as neither player would be in a position at that stage of the game to see the covered move indicia. Actually cards 52 and 62 would each, of necessity, have move indicia located at one end or the other depending upon which color of the pieces would be involved with that file next in the programmed game.

An important aspect of this invention is the availability to the player or players to stop the programmed game at any stage by placing actual chessmen stored in container 20 of FIG. 1 into the position as indicated at that stage of the programmed game over the chess piece symbols on the display cards 13. After the actual chess pieces are all in place, display file cards showing the chess board file, but without any chess piece symbols on the board, are inserted on top of the series of cards for each rank. Play with the chess pieces may be continued to the player's satisfaction and, if desired, he may return to the programmed game to see what would happen had he followed the guidance of the program. Removal of the blank display file cards allows the player or players to immediately resume the game at the stage terminated earlier.

It will be obvious that programmed games may be designed for one or two players and for whole games or only parts of games. It may be desirable to provide a set of display file cards for only openings or for only closings of famous chess games or of expert maneuveurs. All aspects of the chess game may be studied and considered individually or they may be considered as part of whole games.

In regard to the move indicia, showing the piece and the position, rank and file, there are well recognized symbols commonly used by persons studying the game of chess. The move indicia will preferably correspond to those symbols well known by persons playing chess. Of course, modified symbols might be provided for the novice player. For example, it is not necessary to indicate on card 61 pictured in FIG. 7 which knight is involved in the move inasmuch as it is the only knight capable of reaching king's bishop three.

On the simulated chessboard created by the combination of the eight sets of display file cards are located pictorial representations of the chess pieces in their respective positions. These pictorial representations are preferably those readily recognizable by those persons able to play the game. Of course, mere letters or other key symbols may be used to designate the type and color of piece at that position on the chess board.

In order to provide a complete assembly, it is preferred that a move indicator be included. This move indicator may be attached directly to the apparatus of the invention and it is preferably constructed as a moveable slide which will alternately cover the color whose move has passed and uncover in one movement the color of the piece which has the next move. Two additional slide pointers are provided to point to the number of the move. At the start the white move pointer would be pointing to the numeral "one," since white always has the first move, and the black move pointer would be off the scale. As an additional safety factor in keeping track of the moves, the move slide, when it covers the color whose move has passed, also locks that move pointer so that it cannot inadvertently move. Thus, at the start, white is uncovered by the slide and black is covered with its move pointer locked in position. Only when white has completed his move and the move slide uncovers black may the black move pointer be moved to the numeral one. Of course, the white move pointer will be locked in position until black has completed his move.

In order to control the game of chess, it is generally preferred that each player be limited as to the time within which he has to make his move. An hourglass timer is constructed into the case of the apparatus of this invention. One top of the timer is colored white and the other black as an additional aid in keeping track of the moves. A convenient way of holding the hour glass timer in an upright position is to provide small magnets in the bearing housing on which the timer turns. These two magnets are in a straight line alignment with the center of the bearing. There is located in the bearing raceway of the case two additional small magnets with the location of these magnets forming a right angle with the center point of the bearing. Thus, when the hour glass is turned upright in one direction one of the magnets of the bearing will be attracted by a magnet of opposite polarity in the raceway to hold it in position. When the hour glass timer is turned 180 degrees, the second magnet of the bearing will come into alignment with the same raceway magnet to hold it in position again. Likewise, when the timer is to be stored horizontally, the second raceway magnet attracts one of the bearing magnets and holds the timer in that position.

It should be understood that while the present invention has been described in considerable detail with respect to specific embodiments it may be used in other ways without departure from the spirit of the invention or the scope of the appended claims.

I claim:

1. A chess board and programmed playing aid assembly comprising, eight sets of display file cards, one set for each file on the chess board, wherein each card displays the entire file of the chess board with chess piece symbols showing the positions of the pieces on that file at a particular stage of the game, and wherein the uppermost cards of the eight sets make up a complete configuration of a chessboard with pieces in play, move indicia on each display card indicating the color of the piece involved in the next move and the move number of the move, wherein each set of display cards are organized in a program such that when stacked, the display card directly beneath the top card shows the arrival position of the chess pieces or the removal of a piece according to the programmed move of a chessman of that rank, guide and holding means to allow a set of the display file cards to be held in position as a stack on the file of the chessboard to which that set is programmed and to allow singular removal of the top display card to expose the card directly under it without removing the entire stack, and move indicia covering means to prevent general viewing of the move indicia but allow selective uncovering of a single file move indicia.

2. The chess board and programmed playing aid assembly of claim 1, wherein the move indicia show the color of the piece having the next move and the number of that next move.

3. The chess board and programmed playing aid assembly of claim 2 wherein the move indicia covering means consists of two covers for each file move indicia, one cover for selective viewing of the color of the next move and the piece to be moved in the next move, and the second cover to allow selective viewing of the number of the move that display card is next involved in, the position of the piece after the programmed move, and if another file is involved in that particular programmed move.

4. The chess board and programmed playing aid assembly of claim 1 wherein standard chess pieces are provided and blank file cards are insertable in the guide and holding means above the programmed display cards left, if any, whereby the player or players may play out a particular position without the programmed play.

5. The chess board and programmed playing aid assembly of claim 1 wherein a player indicator slide with movement means allowing horizontal movement of the slide to alternately show the color of the chess piece which has the next move, slide markers to indicate by position the move number of each chess piece color, and locking means wherein when one chess piece color is covered by the player indicator slide the move marker for that color is held and prevented from inadvertent movement.

6. The chess board and programmed playing aid assembly of claim 1 wherein the chess piece symbols on the display file cards are pictorial representations of the chess pieces.

7. The chess board and programmed playing aid assembly of claim 1 wherein there is included an hour glass shaped timer to allow timing of each person's move during the game.

* * * * *